(12) United States Patent  
Hong et al.

(10) Patent No.: US 8,484,187 B1
(45) Date of Patent: Jul. 9, 2013

(54) ENHANCED PRESENTATION MODE FOR SEARCH RESULTS

(75) Inventors: Peter Jin Hong, San Francisco, CA (US); Dragan Zivkovic, Sunnyvale, CA (US); Yoshitake Matsumoto, Kanagawa-ken (JP)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 13/253,746

(22) Filed: Oct. 5, 2011

(51) Int. Cl.
*G06F 7/00* (2006.01)
*G06F 17/00* (2006.01)

(52) U.S. Cl.
USPC .......................................... 707/706; 715/200

(58) Field of Classification Search
None
See application file for complete search history.

(56) References Cited

U.S. PATENT DOCUMENTS

| | | | |
|---|---|---|---|
| 6,237,030 B1 | 5/2001 | Adams et al. | |
| 7,370,036 B2 | 5/2008 | Vedula | |
| 7,546,538 B2 | 6/2009 | Shuping et al. | |
| 7,669,142 B2 | 2/2010 | Ray et al. | |
| 7,680,810 B2 | 3/2010 | Marcjan et al. | |
| 7,890,856 B2 | 2/2011 | Chiang | |
| 7,899,803 B2 | 3/2011 | Cotter et al. | |
| 2004/0205514 A1 | 10/2004 | Sommerer et al. | |
| 2006/0085741 A1 | 4/2006 | Weiner et al. | |
| 2007/0011145 A1* | 1/2007 | Snyder | 707/3 |
| 2007/0064018 A1* | 3/2007 | Shoemaker et al. | 345/660 |
| 2008/0307317 A1* | 12/2008 | Yohai-Giochais | 715/748 |
| 2009/0254840 A1* | 10/2009 | Churchill et al. | 715/753 |
| 2010/0211893 A1 | 8/2010 | Fanning et al. | |
| 2011/0131500 A1* | 6/2011 | Ohazama | 715/738 |

* cited by examiner

*Primary Examiner* — Tarek Chbouki
(74) *Attorney, Agent, or Firm* — Fish & Richardson P.C.

(57) ABSTRACT

Methods, systems, and apparatus, including computer programs encoded on computer storage medium, for presenting search results. A method includes displaying a search engine results page in a first or a second presentation mode, wherein, in the first and in the second presentation modes, the search engine results page includes (i) a text region that displays textual information relating to one or more search results that are responsive to a search query and (ii) an image region, wherein, in the first presentation mode, the image region displays contextual information relating to two or more of the search results that are responsive to the search query, and wherein, in the second presentation mode, the image region displays contextual information relating to a single search result that is responsive to the search query; and receiving user input, then switching the search engine results page between the first and second presentation modes.

30 Claims, 4 Drawing Sheets

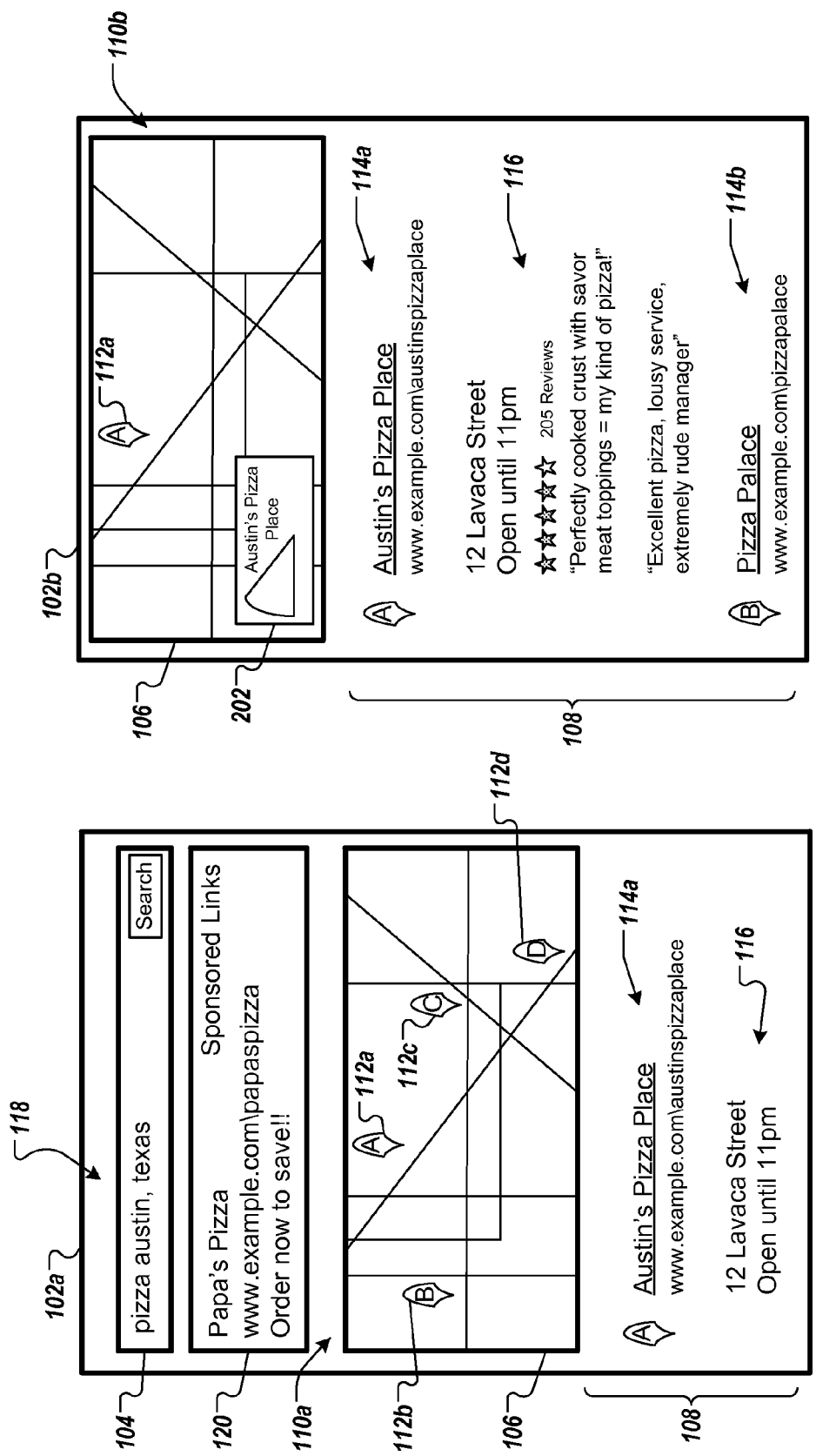

ENHANCED PRESENTATION MODE FOR SEARCH RESULTS

BACKGROUND

The present disclosure relates to search engines, and one particular implementation relates to an enhanced presentation mode for a search engine results page.

A search engine results page (SERP) is a web page that identifies search results that are returned by a search engine in response to a search query. Each search result may, for example, include a link to a resource, a title, an image, a text snippet that may identify where query terms occur within the resource, or other information.

SUMMARY

When viewing a search engine results page, a user of a search engine may instinctively scan the page in a top-to-bottom pattern, and may focus their attention on images before focusing their attention on text. According to an innovative aspect of the subject matter described in this specification, a search engine results page is arranged to include an image that provides context to multiple search results, in a prominent area of the page such as the top. The page is also arranged to include the text of one or more search results in an area on which the user's attention is likely to be focused after they have scanned over the image, such as at the bottom of the page.

Through this arrangement, the user's attention may instinctively be drawn downward over the page to the image, during which time the user can derive insights regarding the set of search results that were returned in response to a search query. The user's attention may then continue to be drawn downward to the text of a particular search result, during which time contextual information that was derived from the image can be supplemented with additional information that is derived from the text of the particular search result. In doing so, the user can quickly learn a significant amount of information about the set of search results, or about a particular search result, in an intuitive manner and with a minimum number of eye movements.

When the user is ready to learn more information about a particular search result, the user can switch the search engine results page from one presentation mode to another presentation mode. In this other presentation mode, the search engine results page is updated to include an image that provides context to a particular search result, and additional text that provides further context to the particular search result. As the user continues to scroll to additional search results, the image may be locked to a particular position on the search engine results page, and may be updated to provide context to a search result to which the user has scrolled.

Innovative aspects of the subject matter described in this specification may be embodied in methods that include the actions of displaying a search engine results page in a first presentation mode or a second presentation mode, wherein, in the first presentation mode and the second presentation mode, the search engine results page includes (i) a text region that displays textual information relating to one or more search results that are responsive to a search query and (ii) an image region, wherein, in the first presentation mode, the image region displays contextual information relating to two or more of the search results that are responsive to the search query, and wherein, in the second presentation mode, the image region displays contextual information relating to a single search result that is responsive to the search query; and receiving a user input, then switching the search engine results page between the first presentation mode and the second presentation mode.

Other embodiments of these aspects include corresponding systems, apparatus, and computer programs, configured to perform the actions of the methods, encoded on computer storage devices.

These and other embodiments may each optionally include one or more of the following features. For instance, in the first presentation mode, the contextual information relating to two or more of the search results comprises a first map that includes icons that specify locations on the first map that are associated with two or more of the search results, and in the second presentation mode, the contextual information relating to a single search result comprises a second map that includes a single icon that specifies a location on the second map that is associated with a single search result. In the second presentation mode, the contextual information comprises an image associated with the single search result, co-located in the image region with the second map. Switching the search engine results page between the first presentation mode and the second presentation mode comprises locking the image region to the top of the search engine results page when switching the search engine results page from the first presentation mode to the second presentation mode. In the first presentation mode, the text region displays a portion of a highest ranked search result, and when the search result page switches from the first presentation mode to the second presentation mode, the text region displays the highest ranked search result and a portion of a next-to-highest ranked search result. The text region displays textual information only. The user input comprises a scrolling gesture input through a proximity-sensitive display of a mobile device. Receiving, by a mobile device, the search results. In the second presentation mode, the image region displays contextual information relating to a single search result only. Switching the search engine results page between the first presentation mode and the second presentation mode comprises updating the image region. The search results comprise local search results. The search results comprise universal search results. In the first presentation mode only, the search engine results page comprises a sponsored content region that displays sponsored content relating to two or more of the search results. The single search result is included in the two or more search results.

Particular embodiments of the subject matter described in this specification may be implemented so as to realize one or more of the following advantages. A user can process search results with a fewer number of eye movements. Search engine results pages may be arranged in a manner that is more consistent with the way that users instinctively process visual information. Users may be shown general information about multiple search results, and specific information about a particular search result, even with limited display space.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 1 depicts an example search engine results page, arranged in a first presentation mode.

FIGS. 2 and 3 depict an example search engine results page, arranged in a second presentation mode.

Like reference symbols in the various drawings indicate like elements.

DETAILED DESCRIPTION

Figure 3:
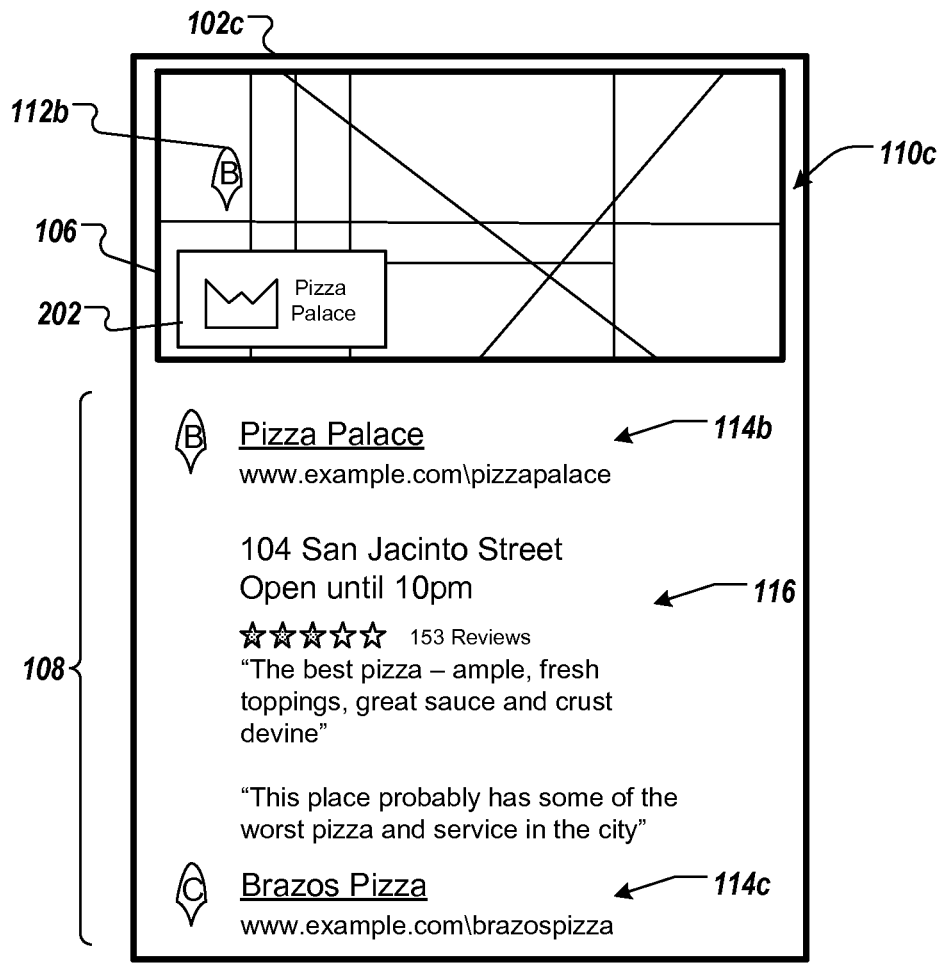

FIG. 1 depicts an example search engine results page 102a, arranged in a first presentation mode, and FIG. 2 depicts an example search engine results page 102b, arranged in a second presentation mode. The search engine results page 102 may be switched between the first presentation mode and the second presentation mode in response to a user input, e.g., based on detecting a scrolling or swiping gesture.

In general, when the search engine results page 102a is arranged in the first presentation mode, the search engine results page 102a includes a search query field 104, an image region 106 that displays one or more images, and a text region 108 that displays the text of one or more search results that are in response to a search query. When the search engine results page 102b is arranged in the second presentation mode, the search engine results page 102b includes the image region 106 that displays one or more updated images, and the text region 108 that displays additional text of the one or more search results that are in response to the search query. In various implementations, other content regions may be included in the first presentation mode and/or the second presentation mode, or certain of the depicted regions may be omitted.

In more detail, in the first presentation mode, the search engine results page 102 includes a search query field 104 that displays query terms 118 (in the figure, "pizza austin, texas") associated with a search query. The search engine results page 102 also includes the image region 106, which includes contextual information, i.e., one or more images relating to two or more of the search results that are identified in response to the search query. For instance, the image region 106 may include a map 110a that includes icons 112a-112d that denote the geographic locations associated with points of interest referenced by several search results that are in response to the search query. The icons 112a-112d may, for example, show the location of four businesses that satisfy the user's information need.

By including contextual information relating to the two or more search results in the image region 106, the search engine results page 102a may provide the user of the search engine with information that the user can use to derive insights relating to several search results. By placing the image region 106 near the top of the search engine results page 102a, the user may quickly encounter the image during a top-to-bottom scan of the search engine results page 102, and may evaluate the contextual information included in the image region 106 before evaluating detailed textual information relating to any particular search result.

For instance, the icons 112a-112d included in the image region 106 may suggest to the user that there are multiple search results for a search query, or that points of interest that are identified by the search query are physically near each other, or are located far apart. Such suggestions may mentally register with the user even though the user has not yet viewed any detailed textual information about a particular search result.

In the first presentation mode, the text region 108 of the search engine results page 102a includes one or more of the search results, or text associated with one or more of the search results. The text region 108 may display a portion of search result 114a, which can include textual context information 116, such as a physical address, opening hours, a rating, or review information. In FIG. 1, for example, the text region 108 displays at least a portion of the search result 114a, which includes textual information relating to a business called "Austin's Pizza Place." In some implementations, the search result 114a is a highest ranked search result.

The text region 108 may be placed beneath the image region 106 on the search engine results page 102a, to allow the user to visually process the image region 106 first, before visually processing the text region 108. Because contextual information relating to the two or more search results is included in the image region 106, and because the user may encounter the image region 106 before the text region 108 when performing a top-to-bottom scan of the search engine results page 102a, the user is able to efficiently glean general information about a set of search results, then specific information about particular search results, using a minimum number of eye movements.

Through the arrangement of content regions shown in FIG. 1, the user's attention may instinctively be drawn downward over the search engine results page 102a to the image region 106, during which time the user can derive insights regarding the set of search results that were returned in response to a search query. The user's attention may then continue to be drawn downward to the text region 108, which shows the text of a particular search result, during which time contextual information that was derived from the image region 106 can be supplemented with additional information that is derived from the text of the particular search result. In doing so, the user can quickly learn a significant amount of information about the search results, or about a particular search result, in a highly intuitive manner. In some implementations, the text region 108 may be placed above the image region 106, placed to the side of the image region 106, or any other position with respect to the image region 106.

In some implementations, the search engine results page 102a includes a sponsored content region 120. The sponsored content region 120 can include sponsored content, e.g., one or more advertisements, related to the search query 118. In FIG. 1, for example, the sponsored content region 118 includes an advertisement for "Papa's Pizza" including a link to the website of "Papa's Pizza" and an advertising slogan "Order now to save!!" In some examples, in addition to the sponsored content region 120 including the sponsored content, one or more of the search results 114a-114d can include sponsored content. Specifically, an icon (e.g., one of the icons 112a-112d) can be associated with a point of interest referenced by a sponsored search result (e.g., one of the search results 114a-114d). In some examples, the sponsored search result would be distinguished (e.g., highlighted) from the remaining search results and the associated icon would be distinguished (e.g., differing coloring) from the remaining icons.

The sponsored content region 120 may be positioned near the top of the search results page 102a, e.g., above the image region 106, as is shown in FIG. 1. However, in other implementations, the sponsored content region 120 can be positioned anywhere on the search results page 102a. For example, the sponsored content region 120 may be position above or below the image region 106 or the text region 108.

In general, when the user is ready to learn more information about a particular search result, the user can switch from one presentation mode, illustrated by search engine results page 102a, to another presentation mode, illustrated by search engine results page 102b. In this other presentation mode, the search engine results page is updated to include an image that provides context to a particular search result that is in response to the same search query provided above with respect to the first presentation mode, and additional text that provides further context to the particular search result. As the user continues to scroll to additional search results, the image may be locked to a particular position on the search engine results page, and may be updated to provide context to a search result to which the user has scrolled.

In more detail, the second presentation mode may be triggered when the user scrolls the search engine results page upward. As shown in FIG. 2, in the second presentation mode, the image region 106 of the search engine results page 102b is locked to a fixed position at the top of the search engine results page 102b, and is updated to include one or more images that provide contextual information relating to fewer than all of the search results.

In one example, the image region 106 is updated to provide contextual information relating to a single search result that is in response to the same search query that is provided above with respect to the first presentation mode. Updating the image region 106 may include adjusting a zoom level of a map, such that the map is re-centered around an icon relating to a particular search result. In some examples, the map includes a location of the user in relation to the icon, with the map re-centered around the icon or the user.

When the image region 106 of the search engine results page 102b includes a map 110b, the map 110b may include a single icon 112a that denotes a physical location associated with a point of interest referenced by the search result 114a. In FIG. 2, in response to the search query that includes query terms 118 "pizza Austin, Tex.," the image region 106 includes the icon 112a showing the location of a business referenced by search result 114a. Notably, the image region 106 does not include icons 112b-d, which show the location of other business referenced by the search results.

In some implementations, the image region 106 further includes an image 202 overlaid on the map 110b. The image 202 can include information relating to the single search result (e.g., the search result 112a), such as a picture, a street view image, an advertisement, or a rendering of a web page associated with the search result 114a. The image 202 can be positioned anywhere in the image region 106. In some examples, the location and/or the size of the image does not conflict with (e.g., overlay) the icons 112a-112d.

The search engine results page 102 also includes the text region 108, which is positioned below the image region 106. Because the user has scrolled the search engine results page upward, the text region 108 includes additional text that provides further context to the search result 114a.

When evaluating information displayed on the search engine results page 102b, the user may visually scan over the image region 106 before scanning the text region 108. Because the image region 106 is displayed above the text region 108, the user can begin to process the image 110b information included in the image region 106 before processing the additional text 116 included in the text region 108. Thus, by including contextual information relating to the single search result presented in the image region 106 and positioning the image region 106 above the text region 108, the user is able to effectively and efficiently process the data of the search results page 102b using a minimum number of eye movements.

In some implementations, the text region 108 includes a partial preview of a search result 114b below the search result 114a. The partial preview of the search result 114b may alert the user that additional search results are available when the search result page 102b, even though the image region 106 includes contextual information for a single search result. In FIG. 2, the text region 108 includes the search result 114a relating to the business "Austin's Pizza Place" and a partial preview of the search result 114b. In some implementations, the search result 114a is the highest ranked search result and the search result 114b is the next-to-highest search result.

The search engine results page can be switched between the first and the second presentation modes in response to receiving a user input. Further, the search engine results page can be switched between the first and the second presentation modes without receiving an additional search query. Specifically, the user can provide a scrolling gesture to the search engine results page 102a, as shown in FIG. 1, such as through a proximity-sensitive display of a mobile device. Also, in response to receiving the scrolling gesture provided by the user, the search engine results page 102a is scrolled upwards until the image region 106 is positioned at the top of the search engine results page 102b, as show in FIG. 2, and further, until the image region 106 is locked to the top of the search engine results page 102b.

Locking of the image region 106 to the top of the search engine results page 102b includes maintaining the image region 106 at the top of the search engine results page 102b once the image region 106 is positioned at the top of search engine results page 102b in response to additional user input, such as scrolling gestures, provided by the user to the search engine results page 102b. Locking of the image region 106 at the top of the search engine results page 102b facilitates maintaining visual continuity when switching between the first presentation mode and the second presentation mode of the search engine results page, and further maintaining visual continuity of the search engine results page when the second presentation mode displays additional search engine results.

FIG. 3 shows the search engine results page 102c, which is displayed when the user continues to scroll the search engine results page 102b upward to view additional text of the search result 114b. In FIG. 3, the map 110c shown in the image region 106 has been updated to include the icon 112b and the image 202 both relating to the search result 114b. Further, the text region 108 includes textual information 116 relating to the search result 114b. Notably, the map 110 does not include icons 112a and 112c-d.

The user can input a scrolling gesture to the search engine results page 102b, such as through a proximity-sensitive display of a mobile device displaying the search engine results page 102b. When the scrolling gesture is received, the text region 108 scrolls from the search result 114a to the search result 114b while the image region 106 is locked to the top of the search engine results page 102b. The image region 106 updates the map 110 to show the icon 112b relating to the search result 114b. In some examples, when the map 100 updates, the map is concurrently re-centered about the icon 112b.

In some examples, in response to receiving the scrolling gesture, the search result 114b stops or "snaps" to a boundary of the image region 106 between the image region 106 and the text region 108. Snapping of the search results 114 to the boundary of the image region 106 prevents the user from missing a search result when scrolling thru the search results 114a-114d.

In the example depicted in FIG. 3, in response to the search query that includes query terms 118 "pizza Austin, Tex.," the image region 106 includes the icon 112b showing the physical location of a business related to the search query. The text region 108 includes the search result 114b relating to the business "Pizza Palace" and a partial preview of a search result 112c.

Figure 4:
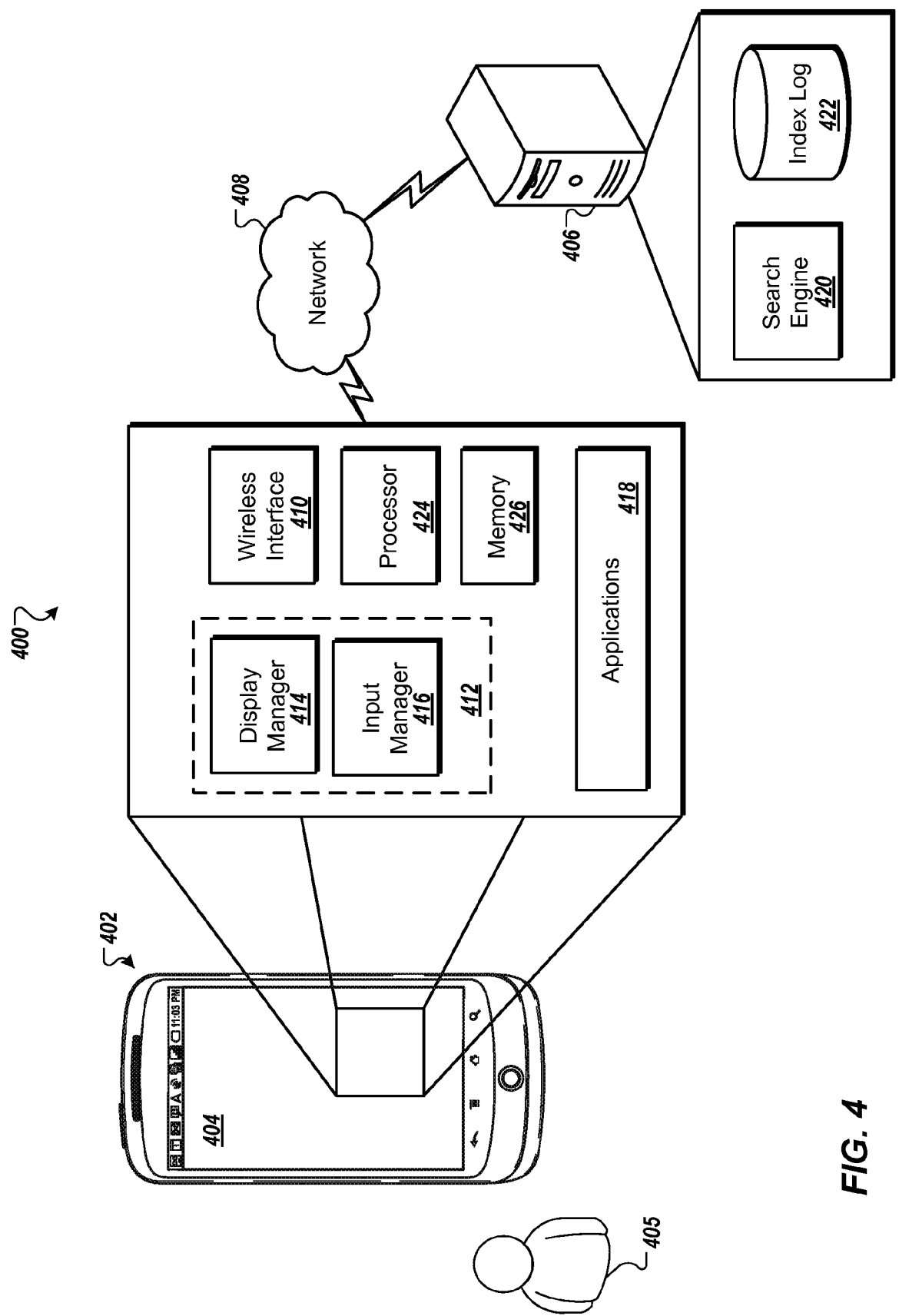
FIG. 4 depicts an example search engine system for displaying an example search engine results page.

FIG. 4 is a block diagram of a system 400 that can execute implementations of the present disclosure. In general, the system 400 includes a mobile device 402 (e.g., a smart phone) with a touchscreen display 404, where the touchscreen display 404 can be used as a graphical user interface (GUI) for the mobile device 402. The touchscreen display 404 can display the search engine result pages 102a-c. A number of components within the mobile device 402 provide for interaction with the mobile device 402. For purposes of clarity, FIG. 4 shows certain example components of the mobile device 402. The mobile device 402 includes an associated user 405.

The mobile device 402 includes a processor 424 and a memory 426 in communication with the processor 424. The mobile device 402 can communicate with a server system 406 through a network 408 using a wireless interface 410. The network 408 can be the internet or a cellular network. For example, the mobile device 402 can direct telephone calls through a telephone network or through a data network using voice over internet protocol (VOIP).

In addition, the mobile device 402 can transmit other forms of data over the internet, for example, data in the form of Hypertext Transfer Protocol (HTTP) requests that are directed at particular web sites. The mobile device 402 may receive responses, for example, in forms that can include but are not limited to mark-up code for generating web pages, media files, and electronic messages.

A number of components running on one or more processors included in the mobile device 402 enable a user to interact with the touchscreen display 404 to provide input and to receive visual output. For example, an interface manager 412 can manage interaction with the touchscreen display 404, and includes a display manager 414 and an input manager 416.

The display manager 414 can manage the information displayed to the user 405 using the touchscreen display 404. For example, an operating system running on the mobile device 402 can use the display manager 414 to arbitrate access to the touchscreen display 404 for a number of applications 418 running on the mobile device 402. For example, the mobile device 402 can display a number of applications, each in its own window on the touchscreen display 404, and the display manager 414 can control what portions of each application are shown on the touchscreen display 404. In another example, the display manager can control the displaying of a virtual artifact.

The input manager 416 can control the handling of data received from the user 405 using the touchscreen display 404 or other input mechanisms. For example, the input manager 416 can coordinate with the display manager 414 to identify where, on the touchscreen display 404, the user 405 is entering information so that that the mobile device 402 may understand the context of the input. In addition, the input manager 416 may determine which application or applications should be provided with the input. For example, input to the mobile device 402 using the touchscreen display 404 can be the user 405 placing their finger on the touchscreen display while manipulating the mobile device 402. The area of the mobile device 402 touched by the user's finger can determine which of the applications 418 the mobile device 402 launches and runs.

The server system 406 can include a search engine 420 and an index log 422. The search engine 420 can be provided as one or more computer programs and the index log 422 can be provided as one or more computer-readable storage media. The search engine 420 receives the search query. In response to receiving the search query, the search engine 420 processes the search query through one or more indices of the index log 422 to identify one or more search results.

Figure 5:
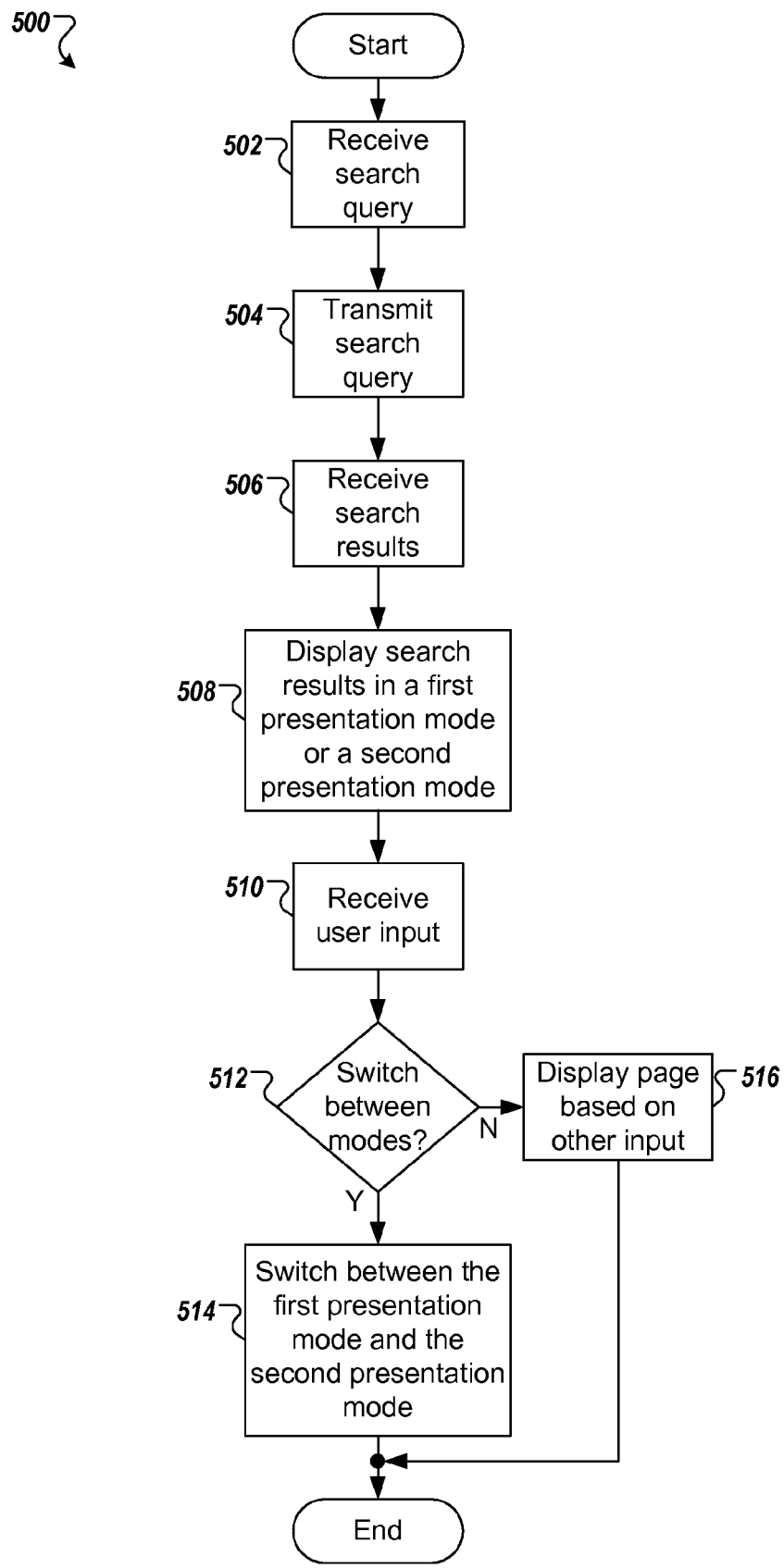
FIG. 5 is a flowchart for displaying an example search engine results page.

FIG. 5 is a flowchart of an example process 500 for displaying a search engine results page in a first presentation mode or a second presentation mode and switching the display between the two modes. The example process 500 can be executed using one or more computing devices. For example, the mobile device 402 and/or the server system 406 employing the system 400 of FIG. 4 can be used to execute the example process 500.

A search query is received (502) and transmitted (504). For example, the search query is input to a search query field by a user. The search query field can be displayed on the touchscreen display of the mobile device.

The search query may be transmitted to a server system by a mobile device employing the network. The search engine processes the search query using an index to identify one or more search results. The search engine obtains the search results, and transmits the search results to the mobile device, where they are received (506). In some implementations, the search results include local search results. For example, the local search results can pertain to a geographic location (such as a neighborhood or city) in which the user is located. In some implementations, the search results include universal search results including, among other things, news, video, images, local, and book search results in combination with search results from web pages. In some implementations, the global search results are independent of the geographic location of the user.

The search results are displayed in the first presentation mode or the second presentation mode (508). For example, the mobile device may display the search results on the search engine results page via the touchscreen display. In the first presentation mode, the image region of the search engine results page includes contextual information relating to two or more search results that are in response to the search query. In the second presentation mode, the image region of the search engine results page includes contextual information relating a single search result that is in response to the search query. In some implementations, the single search result of the second presentation mode is included in the two or more search results of the first presentation mode.

User input is received (510). For example, the mobile device 402 receives user input via the touchscreen display. The user input can include the user providing a swiping gesture across the touchscreen display with respect to the search engine results page.

A determination is made whether the user input is related to switching between the first presentation mode and the second presentation mode (512). For example, the mobile device determines whether the user input, such as the swiping gesture, is related to switching between the first presentation mode of the search engine results page and the second presentation mode of the search engine results page.

If the user input is related to switching between the first presentation mode and the second presentation mode, a switch between the first presentation mode and the second presentation mode occurs (514). For example, the mobile device determines that the swiping gesture provided by the user via the touchscreen display relates to switching between the first presentation mode of the search engine results page and the second presentation mode of the search engine results page and, as a result, switches between the first presentation mode and the second presentation mode. In some implementations, the switch between the first presentation mode and the second presentation mode occurs without receiving an additional search query.

If the user input is not related to switching between the first presentation mode and the second presentation mode, a page is displayed based on other input (516). For example, the mobile device determines that the user input provided via the touchscreen display does not relate to switching between the first presentation mode of the search engine results page and the second presentation mode of the search engine results page and, as a result, displays a page based on the user input. For example, the user input can relate to selection of hyperlink-enabled text of the textual information.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this present disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
    displaying, on a mobile device, a search engine results page that includes (i) a text region that displays textual information relating to one or more search results that are responsive to a search query and (ii) an image region disposed in a position beneath the top of the search engine results page, wherein the image region displays a map that includes icons that specify locations on the map that are associated with two or more of the search results that are responsive to the search query; and
    in response to receiving user input on the mobile device, (i) locking the image region to the top of the search engine results page, (ii) modifying the image region to display a map that includes a single icon that specifies a location on the map that is associated with a single one of the two or more search results that is responsive to the search query, and an image associated with the single one of the two or more search results, and (iii) expanding the text region to display the textual information and additional textual information relating to the single one of the two or more search results that is responsive to the search query.

2. The method of claim 1, wherein the image associated with the single one of the two or more search results is co-located in the image region with the map that includes a single icon.

3. The method of claim 1, wherein the text region and the expanded text region displays textual information only.

4. The method of claim 1, wherein the modified image region displays contextual information relating to the single one of the two or more search results only.

5. The method of claim 1, wherein the expanded image region is an updated version of the image region.

6. The method of claim 1, wherein the search engine results page that includes (i) a text region that displays textual information relating to one or more search results that are responsive to a search query and (ii) an image region disposed in a position beneath the top of the search engine results page, wherein the image region displays a map that includes icons that specify locations on the map that are associated with two or more of the search results that are responsive to the search query a sponsored content region that displays sponsored content relating to the two or more search results.

7. The method of claim 1, wherein the single one of the two or more search result results that is responsive to the search query is included in the two or more search results.

8. The method of claim 1, comprising:
    in response to receiving additional user input after receiving the user input, (i) further modifying the image region to display a map that includes a single icon that specifies a location on the map that is associated with a different, single one of the two or more search results that are responsive to the search query, and an image associated with the different, single one of the two or more search results and (ii) modifying the expanded text region to display textual information that relates to the different, single one of the two or more search results.

9. The method of claim 1, wherein:
    the text region that displays textual information relating to one or more search results that are responsive to a search query displays a portion of a highest ranked search result, and
    the modified text region displays the highest ranked search result and a portion of a next-to-highest ranked search result.

10. The method of claim 1, wherein the user input on the mobile device comprises a dragging input that scrolls the search engine results page towards the top of a display of the mobile device.

11. The method of claim 1, comprising the operation of receiving, by the mobile device, the search results.

12. The method of claim 1, wherein displaying, on a mobile device, a search engine results page that includes (i) a text region that displays textual information relating to one or more search results that are responsive to a search query and (ii) an image region disposed in a position beneath the top of the search engine results page, wherein the image region displays a map that includes icons that specify locations on the map that are associated with two or more of the search results that are responsive to the search query comprises:
    displaying, on a proximity-sensitive display of the mobile device, the search engine results page.

13. A system comprising:
    one or more computers and one or more storage devices storing instructions that are operable, when executed by the one or more computers, to cause the one or more computers to perform operations comprising:
        displaying, on a mobile device, a search engine results page that includes (i) a text region that displays textual information relating to one or more search results that are responsive to a search query and (ii) an image region disposed in a position beneath the top of the search engine results page, wherein the image region displays a map that includes icons that specify locations on the map that are associated with two or more of the search results that are responsive to the search query; and
        in response to receiving user input on the mobile device, (i) locking the image region to the top of the search engine results page, (ii) modifying the image region to display a map that includes a single icon that specifies a location on the map that is associated with a single one of the two or more search results that is responsive to the search query, and an image associated with the single one of the two or more search results, and (iii) expanding the text region to display the textual information and additional textual information relating to the single one of the two or more search results that is responsive to the search query.

14. The system of claim 13, wherein the text region and the expanded text region displays textual information only.

15. The system of claim 13, comprising the operation of receiving, by the mobile device, the search results.

16. The system of claim 13, wherein the modified image region displays contextual information relating to the single one of the two or more search results only.

17. The system of claim 13, wherein the expanded image region is an updated version of the image region.

18. The system of claim 13, wherein the search results comprise local search result.

19. The system of claim 13, wherein the search results comprise universal search results.

20. The system of claim 13, wherein the image associated with the single one of the two or more search results is co-located in the image region with the map that includes a single icon.

21. The system of claim 13, wherein the search engine results page that includes (i) a text region that displays textual information relating to one or more search results that are responsive to a search query and (ii) an image region disposed in a position beneath the top of the search engine results page, wherein the image region displays a map that includes icons that specify locations on the map that are associated with two or more of the search results that are responsive to the search query a sponsored content region that display's sponsored content relating to the two or more search results.

22. The system of claim 13, the operations comprising:
in response to receiving additional user input after receiving the user input, (i) further modifying the image region to display a map that includes a single icon that specifies a location on the map that is associated with a different, single one of the two or more search results that are responsive to the search query, and an image associated with the different, single one of the two or more search results and (ii) modifying the expanded text region to display textual information that relates to the different, single one of the two or more search results.

23. The system of claim 13, wherein:
the text region that displays textual information relating to one or more search results are responsive to a search query displays a portion of a highest ranked search result, and
the modified text region displays the highest ranked search result and a portion of a next-to-highest ranked search result.

24. The system of claim 13, wherein the user input on the mobile device comprises a dragging input that scrolls the search engine results page towards the top of a display of the mobile device.

25. The system of claim 13, wherein displaying, on a mobile device, a search engine results page that includes (i) a text region that displays textual information relating to one or more search results that are responsive to a search query and (ii) an image region disposed in a position beneath the top of the search engine results page, wherein the image region displays a map that includes icons that specify locations on the map that are associated with two or more of the search results that are responsive to the search query comprises:
displaying, on a proximity-sensitive display of the mobile device, the search engine results page.

26. A non-transitory computer-readable medium storing software comprising instructions executable by one or more computers which, upon such execution, cause the one or more computers to perform operations comprising:
displaying, on a mobile device, a search engine results page that includes (i) a text region that displays textual information relating to one or more search results that are responsive to a search query and (an image region disposed in a position beneath the top of the search engine results page, wherein the image region displays a map that includes icons that specify locations on the map that are associated with two or more of the search results that are responsive to the search query; and
in response to receiving user input on the mobile device, (i) locking the image region to the top of the search engine results page, (ii) modifying the image region to display a map that includes a single icon that specifies a location on the map that is associated with a single one of the two or more search results that is responsive to the search query, and an image associated with the single one of the two or more search results, and (iii) expanding the text region to display the textual information and additional textual information relating to the single one of the two or more search results that is responsive to the search query.

27. The non-transitory computer-readable medium of claim 26, wherein the image associated with the single one of the two or more search results is co-located in the image region with the map that includes a single icon.

28. The non-transitory computer-readable medium of claim 26, comprising the operation of receiving, by the mobile device, the search results.

29. The non-transitory computer-readable medium of claim 26, wherein the expanded image region is an updated version of the image region.

30. The non-transitory computer-readable medium of claim 26, wherein the single one of the two or more search result results that is responsive to the search query is included in the two or more search results.

* * * * *

UNITED STATES PATENT AND TRADEMARK OFFICE
CERTIFICATE OF CORRECTION

PATENT NO. : 8,484,187 B1
APPLICATION NO. : 13/253746
DATED : July 9, 2013
INVENTOR(S) : Peter Jin Hong It is certified that error appears in the above-identified patent and that said Letters Patent is hereby corrected as shown below:

In the Claims

Column 13, line 21, Claim 23, after "results" please insert -- that --; and

Column 14, line 8, Claim 26, please delete "(an" and insert therefor -- (ii) an --.

Signed and Sealed this
First Day of October, 2013

Teresa Stanek Rea
*Deputy Director of the United States Patent and Trademark Office*